UNITED STATES PATENT OFFICE.

AUGUSTE J. ROSSI, OF NIAGARA FALLS, NEW YORK, ASSIGNOR TO THE TITANIUM ALLOY MANUFACTURING COMPANY, OF NEW YORK, N. Y., A CORPORATION OF MAINE.

ALLOY OF TITANIUM, COPPER, AND SILICON.

1,023,333.  Specification of Letters Patent.  Patented Apr. 16, 1912.

No Drawing. Original application filed September 14, 1909, Serial No. 517,546. Divided and this application filed January 25, 1912. Serial No. 673,357.

*To all whom it may concern:*

Be it known that I, AUGUSTE J. ROSSI, a citizen of the United States, and a resident of Niagara Falls, in the county of Niagara and State of New York, have invented a certain new and useful Alloy of Titanium, Copper, and Silicon, of which the following is a specification, my present application for patent being a division of my pending application, Serial No. 517,546, filed September 14, 1909.

The object of my present invention is to facilitate, economize in, and improve certain metallurgical processes and procedures and their resulting products, to wit, particularly the incorporation, when required, of silicon and titanium into other metals during manufacture, more especially copper, and, not only this, but to impart to the metals, so treated with titanium and silicon, improved novel properties attributable to my novel procedures hereinafter described.

The beneficial characteristic effects of titanium upon other metals, either as an alloy therewith, or in minute quantities as an eliminator of undesired compounds therefrom, are, by now, well understood; likewise the other characteristic advantages of introducing silicon into such other metals. In some instances I have found it particularly desirable to incorporate, at certain stages, with other metal, notably copper, both titanium and silicon. These manipulations, and their novel, characteristic, beneficial results, have hitherto, I believe, provided unattainable except by resort to introduction of separate and different charges, the one comprising silicon, and the other titanium, or of an alloy, or compound, of silicon on the one hand with other metal, and on the other hand of titanium with another metal, silicon being, strictly speaking, a metalloid, but industrially considered as metal, of which it has the appearance and many properties.

My researches and experiments have demonstrated that it is possible to produce a compound or alloy, of silicon with titanium, comprising also, if desired, copper or other metal, whereby the aforesaid characteristic beneficial effects of silicon and titanium separately introduced, and others resulting from their unison, are imparted to other metals for various purposes.

My present invention thus comprises the production, on a commercial scale, and for the treatment of other metals industrially, of a new article, being a compound, or alloy, of titanium copper and silicon. My said method also includes the proportioning of the constituents in the final product to suit the special requirements of different manufactures, it being thereby possible to vary the respective silicon and titanium contents within very wide limits. In fact the variation of respective proportions is, by my said method, feasible to suit substantially all industrial requirements.

I thoroughly mix together white sand (*i. e.* practically pure silica), rutile (practically pure $TiO_2$) and powdered carbon in suitable proportions to insure in the resulting product the respective desired contents of titanium and silicon according to the formulæ:—

$$SiO_2 + 2C = 2CO + Si$$
$$TiO_2 + 2C = 2CO + Ti.$$

That is: 24 carbon for 60 silica and 80 rutile.

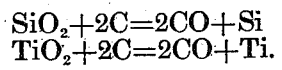

Omitting the fractions in the atomic weights, and taking $C=12$; $Ti=48$; $Si=28$; $O=16$. This is at the rate of 0.40 carbon for 1 silica ($SiO_2$). 0.30 carbon for 1 titanic acid ($TiO_2$).

My mixture having been prepared as above stated, the next step is to charge it into a furnace or other container constructed, and provided with means, to raise the charge to a temperature sufficiently high to insure reduction of the oxids by the carbon and subsequent withdrawal for use of the resulting molten alloy or compound of silicon and titanium in elemental state. I have found it preferable to use for this purpose an electric furnace of any approved type, for instance an electric furnace containing therein two electrodes, or a furnace of the arc type, such as I have hitherto used in the reduction of metallic oxids and is illustrated and described in U. S. Letters Patent No. 802,941, granted to me on October 24, 1908 for process for the reduction of metallic oxids, etc., but it is, of course, to be understood that I do not confine myself to this particular method of supplying the required heat to the charge, and that any apparatus adapted to produce and maintain sufficiently long a temperature adequate to reduce, by carbon, all of the SiO₂ and TiO₂ in the charge will subserve my purpose.

The above referred to electric furnace which I, however, prefer to use for this particular purpose, consists, essentially, as will be observed by reference to the specification and drawings of my aforesaid Letters Patent, in a masonry of graphite materials which constitutes the cathode, and containing within itself a centrally disposed cavity, the bottom of which constitutes the hearth, upon which is built the upper portions of the furnace of refractory materials, the whole being inclosed in an iron casing. Within said central cavity, the cathode, a carbon electrode is vertically movably supported and means supplied for imparting thereto such vertical motion. The electric current may be turned on by sufficiently lowering said anode, thus bringing it into therefor required approximation to the cathode, whereupon the said mixture is charged in around said anode. The required reaction then sets in, resulting finally in entire reduction of the SiO₂ and TiO₂ by the carbon to metallic state.

I incorporate into the silico-titanium, while being produced by my said method as above illustrated, a proportion of an additional metal, as for instance copper, when said silico-titanium is designed for the treatment of copper, thus producing an alloy or compound of copper, silicon and titanium in desired proportions, which may be termed a cupro-silico-titanium. In many instances such addition of the copper appears to facilitate or otherwise favor the desired reduction of the oxids of titanium and silicon. If, for instance, there be added to the said mixture 20 lbs. of copper and the charge subjected to the temperature above described, or even a lower temperature, a resulting metallic product, alloy, or compound, will be obtained, containing

```
Copper _ 20 lbs. )  or ( Cu __ 16.66 +
Silicon__ 70 lbs. } in { Si __ 58.33 +
Ti _____ 30 lbs. )  %  ( Ti __ 25.00
         _____           _____
         120 lbs.           100.00
```

In lieu of metallic copper, its oxid CuO, or any other oxid of copper, may be similarly added to the mixture of silica and titanium oxid in such proportions as to yield, by its reduction, by required increased amount of carbon in the charge, a quantity of copper equal to 16.66 lbs. of copper, according to formula $$CuO + 3C = 3CO + Cu.$$

The presence of the aforesaid cupric content in the mixture appears not only to facilitate the desired reduction of the silica and titanic acid, but it also appears to impart to the resulting product properties useful for certain purposes, as for instance greater fusibility, or capacity for dissolving, on said resulting products being added thereafter to copper in ordinary manufacture for the purpose of improving the same and imparting thereto the characteristic effects of silicon and titanium.

Without departing from my invention, instead of carbon, any other reducing agent might be employed competent to reduce the oxids mentioned.

What I claim as new and desire to secure by Letters Patent is the following, viz:—

1. As a new article of manufacture an alloy, or compound, of copper, silicon and titanium.

2. The aforesaid method for producing an alloy, or compound, of copper, silicon and titanium, which comprises bringing together, in desired proportions, a cupric material, oxid of silicon and oxid of titanium, and a reducing agent, and subjecting them to a temperature sufficient to reduce the oxids and produce as a resulting product the said alloy or compound.

3. The aforesaid method for producing an alloy, or compound, of copper, silicon and titanium, which comprises bringing together, in desired proportions, copper, oxid of silicon and oxid of titanium, and a reducing agent, and subjecting them to a temperature sufficient to reduce the oxids and produce as a resulting product the said alloy or compound.

4. The aforesaid method of producing an alloy, or compound, of copper, silicon and titanium, which comprises bringing together, in desired proportions, copper, oxid of silicon and oxid of titanium, and carbon, and subjecting them to a temperature sufficient to reduce the oxids and produce as a resulting product the said alloy or compound.

AUGUSTE J. ROSSI.

Witnesses:
  WALTER D. EDMONDS,
  PHILIP C. PECK.